United States Patent [19]

Parker et al.

[11] Patent Number: 5,043,455

[45] Date of Patent: Aug. 27, 1991

[54] CROSSLINKABLE RUBBER COMPOSITION

[75] Inventors: Dane K. Parker, Massillon; Arthur H. Weinstein, Hudson; Howard A. Colvin, Tallmadge, all of Ohio

[73] Assignee: The Goodyear Tire & Rubber Company, Akron, Ohio

[21] Appl. No.: 498,528

[22] Filed: Mar. 26, 1990

Related U.S. Application Data

[63] Continuation-in-part of Ser. No. 315,987, Feb. 27, 1989, Pat. No. 4,983,684.

[51] Int. Cl.$^5$ .......................................... C07D 207/00
[52] U.S. Cl. ..................................... 548/537; 548/530
[58] Field of Search .................... 525/329.3, 127, 374, 525/329.1, 375; 548/530, 537

[56] References Cited

U.S. PATENT DOCUMENTS

| | | |
|---|---|---|
| 2,882,260 | 4/1959 | Bartl et al. . |
| 3,694,416 | 9/1972 | Rubens et al. . |
| 3,926,875 | 12/1975 | Tsuyukuni et al. ................ 525/127 |
| 4,008,247 | 2/1977 | Tucker . |

FOREIGN PATENT DOCUMENTS

| | | |
|---|---|---|
| 0194222 | 9/1986 | European Pat. Off. . |
| 0250633 | 1/1988 | European Pat. Off. . |
| 820451 | 9/1959 | United Kingdom . |

OTHER PUBLICATIONS

Database Chemical Abstraccts, (HOST:STN), 1980, Ref. No. 93(8): 73476q, Columbus, Ohio.

*Primary Examiner*—Paul R. Michl
*Assistant Examiner*—T. McDonald, Jr.
*Attorney, Agent, or Firm*—Alvin T. Rockhill

[57] ABSTRACT

It is sometimes desirable to cure rubber compositions utilizing non-sulfur curing agents. The subject invention reveals rubber compositions which can be cured without utilizing sulfur or sulfur containing compounds. The subject invention more specifically discloses a rubber composition which can be crosslinked by heating which is comprised of (1) at least one rubber having pendant blocked isocyanate groups bound thereto; and (2) at least one compound which contains at least 2 Zerewitinoff active hydrogens.

This invention also discloses crosslinking of elastomer compounds containing (1) at least one rubber having functionalized groups containing at least one Zerewitinoff active hydrogen and (2) at least one compound which contains at least two blocked isocyanate groups. This invention also discloses self-curing elastomers containing both blocked isocyanate groups and groups containing at least one active Zerewitinoff hydrogen.

1 Claim, No Drawings

CROSSLINKABLE RUBBER COMPOSITION

This is a continuation-in-part of application Ser. No. 07/315,987, filed on Feb. 27, 1989, now U.S. Pat. No. 4,983,684.

BACKGROUND OF THE INVENTION

Elastomers can be crosslinked by a number of techniques as described by A. Coran in "Science and Technology of Rubber" Chapter 7. Most elastomers are cured using sulfur or peroxide vulcanization although curatives such as phenolic resins, quinone derivatives, maleimide derivatives and metal oxides can also be employed in the crosslinking reaction.

A novel crosslinking reaction was reported in Kautschuk Gummi Kunststoffe 8/83 which discloses a cure system consisting of the adduct of a diisocyanate with nitrosophenol. In this cure system, the nitrosophenol is released at cure temperature and reacts with the elastomer. Crosslinking occurs when the diisocyanate reacts with functionality on the polymer bound nitrosophenol. This blocked isocyanate curative is incorporated in a step separate from the polymerization.

Polymer bound isocyanates have been used as part of a curing package of acrylate polymers. European Patent Application Publication No. 130,322 discloses that acrylate polymers containing m-isopropenyl α,α-dimethyl benzylisocyanate (TMI) can be cured and that the polymers can be used in coating applications. U.S. Pat. No. 4,694,057 discloses that elastomers containing small amounts of 1-(1-isocyanato-1-methylethyl)-3-(1-methylethenyl)-benzene (TMI) can be crosslinked by utilizing difunctional or polyfunctional active hydrogen compounds. For instance, U.S. Pat. No. 4,694,057 discloses that elastomers which are difficult to cure with sulfur or sulfur containing compounds, such as polychloroprene, can be cured utilizing such a technique. However, neither the teachings of European Patent Publication No. 130,322 or U.S. Pat. No. 4,694,057 suggest any advantage that can be realized by blocking the isocyanate groups in the elastomer. In fact, neither of the subject references disclose the possibility of curing such compounds which contain blocked isocyanate groups. Problems associated with premature crosslinking have hindered the commercial development of cure systems which rely on crosslinking through unblocked isocyanate groups in elastomers.

SUMMARY OF THE INVENTION

This invention discloses a technique for curing rubber compositions which does not rely upon sulfur or sulfur containing compounds. The cure systems of the subject invention rely upon the reaction between a blocked isocyanate group and an active Zerewitinoff hydrogen atom. The utilization of the process of this invention accordingly results in a urethane or urea type cure. One benefit realized by utilizing the process of this invention is that premature crosslinking of the elastomer is generally not a significant problem if the appropriate blocking group is used.

The subject invention more specifically discloses a rubber composition which can be crosslinked by heating which is comprised of (1) at least one rubber having pendant blocked isocyanate groups bound thereto: and (2) at least one compound which contains at least 2 Zerewitinoff active hydrogens.

The subject invention also reveals a rubber composition which can be crosslinked by heating which is comprised of (1) at least one rubber having Zerewitinoff active hydrogens bound thereto: and (2) at least one compound having at least 2 blocked isocyanate groups bound thereto.

The subject invention further discloses a rubber composition which can be crosslinked by heating which is comprised of polymer chains having (1) pendant blocked isocyanate groups bound thereto: and (2) Zerewitinoff active hydrogens bound thereto.

There are different requirements for each of the previous approaches. In all cases the polymer must not undergo premature crosslinking during the polymer drying step or when the polymer is mixed with other ingredients necessary for good elastomeric compounds. These polymers are generally prepared by an emulsion process and must be coagulated and dried. In commercial operations, emulsion polymers are dried at 200°–230° F. for approximately 45 minutes. This polymer is then mixed with carbon black in a non-productive mix at 300°–330° F. for 1–3 minutes. The curative is added to the rubber from the non-productive mix in a productive mix at 220° F. Thus, polymers containing the blocked isocyanate functionality cannot undergo extensive deblocking at drying conditions or during the non-productive mix or the material will become unworkable. In the case where the polymer contains the Zerewitinoff active hydrogen, premature vulcanization is not a problem. The blocked isocyanate compound curative must only be stable to the productive mix which takes place at 220° F. for 1–2 minutes.

The following reaction depicts the curing of a rubber having pendant blocked isocyanate groups bound thereto with a curative which contains two Zerewitinoff active hydrogens. In the first step of the reaction, the blocking agent represented as X is removed from the isocyanate group by the action of heat as follows:

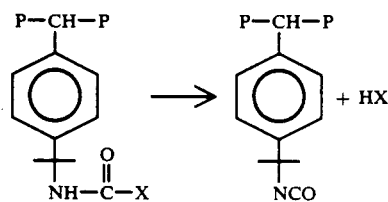

wherein P represents polymer chains of the rubber. In the second stage of the curing reaction, the curative containing two active Zerewitinoff hydrogens reacts with the free isocyanate groups on two different polymer chains of the rubber being cured. This reaction is depicted as follows:

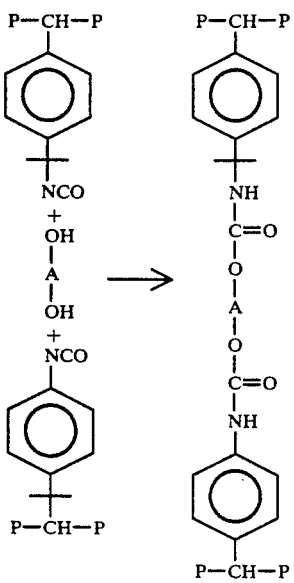

wherein A represents an alkylene group or an arylene group. The same basic reactions are utilized in curing rubbers having active Zerewitinoff hydrogens bound thereto with curatives containing at least two blocked isocyanate groups. In such reactions, the heat utilized to cure the rubber causes the blocking group to be removed thereby creating a free isocyanate group which is then available to react with active Zerewitinoff hydrogens on the rubber. Similarly, identical reactions take place wherein the rubber being cured contains both pendant blocked isocyanate groups and active Zerewitinoff hydrogen atoms. In such cases, it is, of course, not necessary to utilize a separate curative. In other words, rubbers which contain both pendant blocked isocyanate groups and Zerewitinoff active hydrogen atoms have a built in cure package.

Rubbers having pendant blocked isocyanate groups bound thereto can be prepared utilizing a wide variety of techniques. For instance, U.S. Pat. No. 4,429,096 discloses a process wherein the isocyanate group on meta-TMI is blocked with a cationic carbamic structure and then polymerized into a polymer. The technique disclosed in U.S. Pat. No. 4,429,096 is highly suitable for preparing rubbers having pendant blocked isocyanate groups which can be utilized in accordance with the process of this invention. U.S. Pat. No. 4,604,439 also discloses a technique for incorporating blocked TMI into polymers utilizing emulsion polymerization. The teachings of U.S. Pat. No. 4,429,096 and U.S. Pat. No. 4,604,439 are incorporated herein by reference in their entirety. U.S. Pat. No. 4,694,057 discloses a technique for polymerizing unblocked TMI into rubbers utilizing an emulsion polymerization technique. Such rubbers containing unblocked TMI can be blocked by reacting the rubber containing unblocked TMI with an appropriate blocking agent. In fact, any rubber containing pendant unblocked isocyanate groups can be blocked by reacting the unblocked isocyanate groups thereon with an appropriate blocking agent.

A wide variety of compounds can be utilized to block isocyanate groups in accordance with the process of this invention. Some representative examples of suitable compounds for utilization as blocking agents include phenols, oximes, caprolactam, pyrrolidone, mercaptans and β-keto esters. Blocking agents which can be utilized are discussed in greater detail in Z. Wicks, Journal of Coatings Technology, "Progress in Organic Coatings", Vol. 5, page 73 (1975) and Z. Wicks, Journal of Coatings Technology, "Progress in Organic Coatings", Vol. 9, page 3 (1981), which are incorporated herein by reference in their entirety.

The blocking agents which are preferred for utilization in the process of this invention include alcohols, cyclic amides, ketoximes, phenols, and secondary amines. The cyclic amides which can be utilized typically have the structural formula:

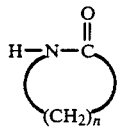

wherein n is an integer from 2 to about 10. It is normally preferred for n to be an integer from 3 to 5. Caprolactam which has the structural formula:

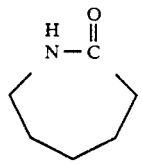

and a deblocking temperature which is within the range of about 110° C. to about 140° C. and 2-pyrrolidone which has the structural formula:

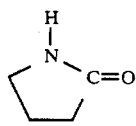

and a deblocking temperature which is within the range of about 160° C. to about 190° C. are highly preferred blocking agents.

The ketoximes which can be utilized as blocking agents typically have the structural formula:

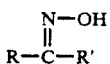

wherein R represents an alkyl group containing from 1 to 10 carbon atoms and wherein R' represents a hydrogen atom or an alkyl group containing from 1 to 10 carbon atoms. Phenol and substituted phenols can also be utilized as the blocking agent. The secondary amines which can be utilized as blocking agents typically have the structural formula:

wherein R represents an aryl group and wherein R' represents an aryl or an alkyl group.

A rubber having pendant blocked isocyanate groups bound thereto wherein 2-pyrrolidone is utilized as the blocking agent is depicted as follows:

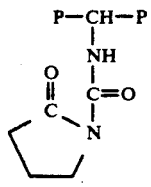

wherein P represents polymer chains of the rubber. 2-pyrrolidone is a particularly valuable blocking agent because it has a deblocking temperature which is within the range of about 160° C. to about 190° C. When the blocked isocyanate is heated to the deblocking temperature, the blocking group is released exposing the free isocyanate. The free isocyanate then undergoes the curing reaction. In cases where the isocyanate is not blocked, premature crosslinking reactions occur making processing of the elastomer difficult if not impossible. Different blocking groups can be employed depending on what processing and curing temperatures are desired. If the rubber is processed at temperatures higher than the deblocking temperature, premature crosslinking or scorch of the rubber will occur. The higher the deblocking temperature is, the more latitude there is in processing of the rubber but cure temperatures must, of course, be higher in order for deblocking and subsequent crosslinking to occur. As the deblocking temperature is lowered, the rubber must be processed more gently but can be effectively cured at a lower temperature. Thus, the deblocking group can be chosen to give the optimal mix of scorch safety and cure temperature. The deblocking temperature of 2-pyrrolidone has been found to be very good in some applications. The deblocking temperature of caprolactam is somewhat lower but can also be used effectively as a blocking agent in curing some rubber compounds.

Zerewitinoff active hydrogen is reactive as determined by the Zerewitinoff method as described in the Journal of the American Chemical Society, Vol. 49, page 3181 (1927). The Zerewitinoff active hydrogen will typically be present in a hydroxyl group, amine group, carboxyl group or thiol group. Zerewitinoff hydrogens which are present in hydroxyl groups are the most highly preferred. Zerewitinoff hydrogen atoms which are present in amine groups are also very good. However, amines react very readily with isocyanate groups which results in a very fast rate of cure. In fact, the rate of cure attained utilizing amines as the source of Zerewitinoff active hydrogen atoms can be too fast. The Zerewitinoff hydrogen present in carboxyl groups is far less active and promotes a much slower rate of cure. For this reason, carboxyl groups are not a preferred source of Zerewitinoff active hydrogen. The optimum rate of cure is believed to be attained when hydroxyl groups are utilized as the source of Zerewitinoff active hydrogen. Curatives can be utilized which contain at least two Zerewitinoff active hydrogen atoms. These compounds will typically have boiling points which are above the cure temperature of the rubber composition. In cases where the curative contains at least two blocked isocyanate groups, the blocking groups will also have a boiling point which is above the cure temperature utilized in crosslinking the rubber composition.

Catalysts can be utilized in order to accelerate the reaction between the Zerewitinoff active hydrogen and isocyanate groups. Such catalysts are of particular importance in cases where the blocking agent has a very high deblocking temperature. For instance, the utilization of such catalysts is of particular value in cases where 2-pyrrolidone is utilized as the blocking agent. Catalysts capable of speeding up both the deblocking reaction and the reaction of the free isocyanate groups with the Zerewitinoff active hydrogen can be utilized. For example, tin salts, bismuth compounds, mercury compounds, tertiary amines, iron acetyl acetonate, cobalt acetyl acetonate and nickel acetyl acetonate can be utilized as the catalyst. Tin salts such as dibutyltin dilaurate, dimethyltin dilaurate, dibutyltin diacetate, and dimethyltin diacetate are most preferred. Dialkyltin sulfides are also highly preferred catalysts.

The rubber compositions of this invention will typically contain from about 0.001 moles to about 0.4 moles of blocked isocyanate groups per 100 grams of polymer. The rubber compositions of this invention will preferably contain from about 0.005 moles to about 0.1 moles of blocked isocyanate groups per 100 grams of polymer. Such rubber compositions will more preferably contain from about 0.01 to about 0.03 moles of blocked isocyanate groups per 100 grams of rubber. The rubber compositions of this invention will typically have a molar ratio of Zerewitinoff active hydrogen atoms to blocked isocyanate groups of at least about 0.5:1. Such rubber compositions will typically have a ratio of Zerewitinoff active hydrogen atoms to blocked isocyanate groups which is within the range of about 0.6:1 to about 2:1. The ratio of Zerewitinoff active hydrogen atoms to blocked isocyanate groups in the rubber composition will preferably be within the range of about 0.7:1 to about 1.4:1. More preferably, the ratio of Zerewitinoff active hydrogen atoms to blocked isocyanate groups will be within the range of about 0.8:1 to about 1.2:1. However, it should be noted that a very substantial excess of Zerewitinoff active hydrogen atoms over the amount of blocked isocyanate groups present typically is not detrimental in rubbers containing both pendant blocked isocyanate groups and Zerewitinoff active hydrogen atoms.

In general, the elastomer containing one or both polymer bound curatives can be compounded using classical rubber compounding technology such as given by Long in his book "Basic Compounding and Processing of Rubber". There are several advantages associated with using the technology disclosed in the instant invention. In typical rubber formulations, sulfur, and at least one accelerator is commonly used to affect the cure. To activate the sulfur, zinc oxide and stearic acid are usually employed. In the cure system of the instant invention, one or both of the curatives is attached to the polymer. Thus, the total number of ingredients that must be added to the compound may be less with the instant invention than with a conventional sulfur cure. This leads to greater product uniformity because there are fewer items to weight and potentially fewer places to misweigh ingredients in the compounding step. Additionally, the non-sulfur crosslinks may have better stability to aging than the sulfur crosslinks.

The following examples are merely for the purpose of illustration and are not to be regarded as limiting the scope of the invention or the manner in which it can be practiced. Unless specifically indicated otherwise, parts and percentages are given by weight.

EXAMPLE 1

General Recipes and Procedures for Incorporation of C/T or HEMA into NBR

Two types of functionally substituted NBR rubbers (nitrile rubbers) were prepared for cure via urethane chemistry. One contained monomer units of caprolactam/TMI (C/T) adduct:

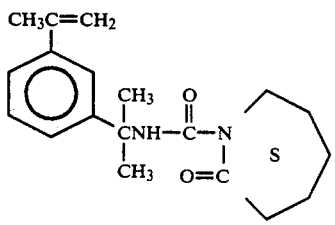

The other contained units of β-hydroxyethyl methacrylate (HEMA). The C/T monomer is a white crystalline compound having a melting point of 59°-62° C. The same general redox recipe was used for copolymerization of both of these compounds into NBR and is shown in Table I as Recipes A and B.

TABLE I

| Ingredient | A | B |
|---|---|---|
| Deionized water | 194.0 | 198.5 |
| Potassium soap of hydrogenated mixed fatty acids | 5.00 | 2.50 |
| Na$_3$PO$_4$ 12H$_2$O | 0.20 | 0.20 |
| Diisopropyl xanthogen disulfide (DIXIE) | 1.50 | — |
| C$_{12}$-C$_{14}$ p-menthane hydroperoxide (50+%) | See Table II .08 | .09 |
| Butadiene-1,3 | 66.0 | 66.0 |
| Aliphatic mercaptans | See Table II | |
| Acrylonitrile | See Table II | |
| C/T | See Table II | |
| HEMA | See Table II | |
| Add through septum to above air free systems: | | |
| FeSO$_4$ 7H$_2$O | .0041 | .001 |
| H$_2$SO$_4$ | .007 | .007 |
| Sodium ethylene diamine tetraacetate (38% aq solution) | .024 | .006 |
| H$_2$O, soft | 6.0 | 1.50 |

The polymerizations were run in quart bottles at 65° F. After reaching the desired conversion level, the polymerizations were shortstopped with an aqueous solution containing 0.3 parts of sodium dimethyl dithiocarbamate and 0.04 parts of N,N-diethylhydroxylamine.

NBR/caprolactam/TMI adduct copolymer productive stocks were prepared by blending all the components listed below in an unheated Brabender in a one pass mix. The mixes were blended for about 7 minutes at 80 rpm. The maximum temperatures developed during mixing were between 220°-223° F. (104°-106° C.). The blended stock was cured in a hydraulic press in strip molds using the conditions used in Table III.

In one instance, DIXIE was used as a chain transfer agent for copolymerization of C/T. In the others, a tertiary aliphatic mercaptan containing from 12 to 14 carbon atoms (Sulfole ™ 132) was used as the chain transfer agent for copolymerization of either C/T or HEMA monomers. Data relating to the monomer charge level or polymerization time on the degree of monomer incorporation are indicated in Table II.

Portions of NBR copolymers to be analyzed were prepared by coagulation of latex into isopropyl alcohol, washing small pieces of coagulum twice each successively with deionized water and isopropyl alcohol and vacuum drying.

C/T content of NBR copolymers was determined by nmr analysis of perdeutero acetone solutions on the basis of aromatic C—H bond content. C/T content of other copolymers was calculated on the basis of infrared transmittance data. A known concentration of copolymer was analyzed and the carbonyl absorption at 1706 cm$^{-1}$ was compared to a calibration curve.

The HEMA segmer content of NBR copolymers was determined by acetylation of a toluene solution of polymer with an acetic anhydride/pyridine mixture and titrating the residual acetic anhydride.

All of the rubbers made in runs 1-9 were soluble in both methyl ethyl ketone and toluene.

NBR/HEMA copolymers from runs 7 and 8 of Table II were similarly compounded and cured using different levels of a caprolactam-blocked diisocyanate with the structure:

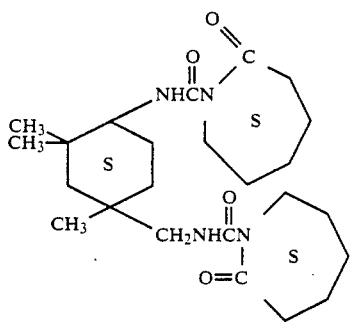

under varying cure conditions. Physical properties obtained by cures are indicated respectively in Tables III and IV.

TABLE II

| | Incorporation of C/T or HEMA into NBR | | | | | | | | |
|---|---|---|---|---|---|---|---|---|---|
| Polymerization | Run Number | | | | | | | | |
| Parameters | 1 | 2 | 3 | 4 | 5 | 6 | 7 | 8 | 9 |
| Recipe (Table I) | A | A | B | B | B | B | B | B | B |
| Parts Charged: | | | | | | | | | |
| Acrylonitrile | 27.5 | 27.5 | 27.5 | 27.5 | 27.5 | 26.0 | 30.0 | 30.0 | 28.0 |
| DIXIE | 1.50 | 1.50 | — | — | — | — | — | — | — |
| RSH | — | — | 0.90 | 0.78 | 0.78 | 0.78 | 0.90 | 0.90 | 1.10 |
| C/T | 6.50 | 6.50 | 6.50 | 6.50 | 6.50 | 8.00 | — | — | — |
| HEMA | — | — | — | — | — | — | 4.00 | 4.00 | 6.00 |
| Conversion, % | 64 | 74 | 76 | 83 | 87 | — | 68 | 75 | — |
| Polymerization Time @65° F., hours | 10 | 13 | 9 | 9.5 | 11 | — | 9 | 10 | — |
| Polymerization Characteristics: | | | | | | | | | |

TABLE II-continued

Incorporation of C/T or HEMA into NBR

| Polymerization Parameters | Run Number | | | | | | | | |
|---|---|---|---|---|---|---|---|---|---|
| | 1 | 2 | 3 | 4 | 5 | 6 | 7 | 8 | 9 |
| Mooney, ML4/212° F. | — | — | — | 24 | 34 | 29 | — | — | 36 |
| Parts C/T Bound: | | | | | | | | | |
| By NMR | — | 4.8 | 3.1 | — | — | — | — | — | — |
| By IR | — | — | — | 4.5 | 4.5 | 5.6 | — | — | — |
| Parts HEMA Bound: | | | | | | | | | |
| (Titration) | — | — | — | — | — | — | — | 1.88 | 3.87 |

TABLE III

Properties of NBR Containing Blocked Isocyanate Cured with Diols

| Compound | A | B | C | D | E | F |
|---|---|---|---|---|---|---|
| Polymer from run # | 2 | 3 | 3 | 3 | 3 | 3 |
| Weight Polymer | 100.0 | 100.0 | 100.0 | 100.0 | 100.0 | 100.0 |
| ISAF Black | 45.0 | 45.0 | 45.0 | 45.0 | 45.0 | 45.0 |
| Irganox 1076 | 1.0 | 1.0 | 1.0 | 1.0 | 1.0 | 1.0 |
| Tetramethylene glycol | 0.75 | 0.49 | 0.49 | 0.53 | — | — |
| Hydroxy terminated polytetramethylene oxide (equivalent wt. 2520) | — | — | — | — | 29.8 | 29.8 |
| Cure Temp., °F./time, min. | 350/25 | 350/30 | 350/30 + 380/20 | 350/30 | 350/30 | 380/30 |
| Vulcanizate Properties: | | | | | | |
| Tensile strength, psi | (a) | 2700 | 2140 | 3330 | 2820 | 2870 |
| Elongation % | | 450 | 400 | 510 | 200 | 200 |
| 100% Modulus | | 250 | 250 | 240 | 850 | 890 |
| Shore A Hardness | | 64 | 64 | 63 | 69 | 68 |
| Volume swell in ASTM oil, after 70 hours at 300° F. (149° C.), % | | 25.2 | 26.9 | 22.4 | 21.5 | 20.9 |

(a) Vulcanizate porous because of gas evolution

TABLE IV

Cure of NBR Containing Hydroxy Groups with a Blocked Diisocyanate

| Compound No. | G | H |
|---|---|---|
| Polymer from run # | 8 | 9 |
| Weight of Polymer | 100.0 | 100.0 |
| ISAF black | 45.0 | 45.0 |
| Irganox 1076 | 1.0 | 1.0 |
| Caprolactam blocked isophorone diisocyanate | 7.1 | 14.7 |
| Cure Conditions F/min | 350/15 | 350/30 |
| Vulcanizate Properties: | | |
| Tensile Strength, psi | 1180 | 1590 |
| Elongation, % | 230 | 170 |
| 100% Modulus | 480 | 940 |
| Shore A Hardness | 73 | 73 |
| Volume Swell in ASTM #3 oil, after 70 hours at 300° F. (149° C.), % | 22.2 | 21.2 |

The data in Tables III and IV illustrated several features of the vulcanization process. Use of diisopropyl xanthogen disulfide as a chain transfer agent leads to porous vulcanizates (Compound A). This is probably caused by elimination of carbon oxysulfide from the ends of the polymer chain. Also, vulcanizates can be obtained by either binding the blocked isocyanate to the rubber and curing with a diol (Compounds B-F), or by binding the alcohol functionality to the polymer and curing with a blocked isocyanate (Compounds G-H).

TABLE V

Preparation of a Hydroxy functionalized SBR

| Run Number | 10 |
|---|---|
| Deionized water | 190.00 |
| Potassium Phosphate | 0.42 |
| Potassium Stearate | 5.00 |
| Mixture of C-12 mercaptans | 0.35 |
| p-menthane hydroperoxide (50%) | 0.05 |
| Hydroxypropyl methacrylate (HPMA) | 4.00 |
| Styrene | 26.00 |
| Butadiene | 70.00 |
| Activator solution: | |
| iron (II) sulfate heptahydrate | 0.007 |
| Sodium EDTA (38% aqueous solution) | 0.04 |
| sulfuric acid/water (pH 5) | 10.00 |
| Sodium formaldehyde sulfoxylate | 0.03 |

Table V gives the properties of an SBR containing hydroxypropyl methacrylate.

The emulsion was polymerized in the absence of oxygen at 50° F. (10° C.). After polymerizing the emulsion for 8 hours, 68% of the monomer charge was converted. A 10% aqueous solution containing 0.3 parts of sodium dimethyldithiocarbamate and 0.04 parts of N,N-diethyl hydroxylamine was added to shortstop the reaction. 2.0 parts per hundred monomer of a 50% emulsion of Wingstay ® C (a commercial antioxidant) was added to stabilize the rubber to drying. The emulsion was coagulated and dried at 150° F. (66° C.) in a circulating air oven. The rubber contained 4.1% bound hydroxypropyl methacrylate.

The rubber was vulcanized in the following recipes:

| Compound No. | I | J | K |
|---|---|---|---|
| Rubber (from run #10) | 100.00 | 100.00 | 100.00 |
| ISAF black | 45.00 | 45.00 | 45.00 |
| Processing oil | 10.00 | 10.00 | 10.00 |
| Dibutyltindilaurate (catalyst) | 0.05 | 0.05 | 0.05 |
| Caprolactam blocked TMXDI | 5.78 | 6.52 | 7.26 |

-continued

| Compound No. | I | J | K |
|---|---|---|---|
| Vulcanizate Properties for Cures at 350° F. for 35 minutes: | | | |
| Tensile strength, psi | 1510 | 1960 | 2100 |
| Elongation, % | 630 | 640 | 590 |
| Shore A Hardness | 57 | 59 | 62 |

The data from compounds I-K illustrate that the concept of curing rubber containing Zerewitinoff active hydrogens with blocked diisocyanates is applicable to SBR (styrene-butadiene rubber) as well as nitrile rubber.

TABLE VI

Preparation of Rubbers Containing both Blocked Isocyanate Functionality and Hydroxyl Functionality

| Run Number | 11 | 12 | 13 |
|---|---|---|---|
| Deionized water | 200.0 | 200.0 | 200.0 |
| Sodium Dodecylbenzene sulfonate | 2.0 | 2.0 | 2.0 |
| Sodium persulfate | 0.4 | 0.4 | 0.4 |
| Sodium phosphate dodecahydrate | 0.5 | 0.5 | 0.5 |
| Pyrrolidone-blocked TMI | 5.5 | 5.5 | 5.5 |
| Styrene | 22.3 | 21.1 | 21.5 |
| Hydroxypropyl methacrylate | 2.2 | 2.6 | 3.0 |
| Mixture of tertiary dodecylmercaptans | 0.38 | 0.38 | 0.38 |
| Butadiene | 70.0 | 70.0 | 70.0 |
| Hours of Polymerization at 125° F. (52° C.) | 7.5 | 7.0 | 7.0 |
| % Conversion | 79.0 | 79.0 | 82.0 |
| Parts pyrrolidinone-blocked TMI bound to the polymer | 3.7 | 3.6 | 3.4 |
| Parts Bound Hydroxypropyl Methacrylate bound to the polymer | 4.7 | 6.9 | 4.8 |

The polymerizations were shortstopped by addition of an aqueous solution of dimethyldithiocarbamate and diethylhydroxylamine. After excess monomers were removed by steam stripping, 0.5 phr Wingstay ® L/0.5 phr triarylphosphite dispersion was added to the latex. The latex was coagulated and dried in a circulating air oven at 140°-150° F. (60°-66° C.). The rubbers were compounded in the following formulations:

| Compound No. | L | M | N |
|---|---|---|---|
| Rubber from run # | 11 | 12 | 13 |
| Weight of rubber | 100.0 | 100.0 | 100.0 |
| ISAF black | 50.0 | 50.0 | 50.0 |
| Aromatic Oil | 10.0 | 10.0 | 10.0 |
| Wingstay ® L (antioxidant) | 0.5 | 0.5 | 0.5 |
| Dibutyltin dilaurate catalyst | 0.05 | 0.05 | 0.05 |
| Cure Conditions °F./minutes | 390/35 | 390/35 | 390/35 |
| Vulcanizate Properties: | | | |
| Tensile Strength, psi | 2600 | 2550 | 2500 |
| Elongation | 550 | 540 | 490 |
| 300% Modulus | 1200 | 1300 | 1350 |
| Shore A Hardness | 59 | 60 | 61 |

Thus, the data in Table VI indicate that polymers containing both the blocked isocyanate and the hydroxyl group can be vulcanized without the addition of any further curatives.

EXAMPLE 14

In this experiment a self-stabilized styrene-butadiene rubber containing both blocked isocyanate functionalities and hydroxyl functionalities was synthesized. The redox recipe utilized in the polymerization contained the following ingredients (shown in parts by weight):

| Deionized water | 195.0 |
|---|---|
| Sodium dodecylbenzene sulfonate | 2.5 |
| Potassium phosphate | 0.45 |
| Pyrrolidinone blocked TMI | 6.7 |
| N-(4-anilinophenyl)methacrylamide | 1.4 |
| Styrene | 19.3 |
| Hydroxypropyl methacrylate | 2.6 |
| Tertiary dodecylmercaptans | 0.33 |
| 1,3-butadiene | 70.0 |
| as an activator system: | |
| Iron (II) sulfate heptahydrate | 0.0068 |
| Sodium EDTA (38% aqueous solution) | 0.015 |
| Sulfuric acid/water solution (pH = 5) | 10.0 |
| Sodium formaldehyde sulfoxylate | 0.04 |
| p-menthane hydroperoxide | 0.06 |

The emulsion made was polymerized in the absence of oxygen at 65° F. (18.5° C.). After allowing the polymerization to continue for 9.5 hours, 75% of the monomer charge was converted. A 10% aqueous solution containing 0.3 parts of sodium dimethyldithio carbamate and 0.04 parts of N,N-diethylhydroxyl amine was added to shortstop the reaction. The emulsion was coagulated and dried at 150° F. (66° C.) in a circulating air oven. The resulting dried polymer was soluble in methylene chloride and chloroform. Infrared analysis of a solution cast film of the polymer indicated that it contained hydroxyl, blocked isocyanate and antioxidant functionalities.

EXAMPLE 15

In this experiment an additional self-stabilized styrene-butadiene rubber containing both blocked isocyanate functionalities and hydroxyl functionalities was made. The emulsion utilized in the polymerization contained the following ingredients (shown in parts by weight):

| Deionized water | 198.5 |
|---|---|
| Sodium phosphate | 0.2 |
| Potassium stearate | 2.5 |
| Pyrrolidinone blocked TMI | 5.9 |
| N-(4-anilinophenyl)methacrylamide | 1.4 |
| Acrylonitrile | 24.2 |
| Hydroxypropyl methacrylate | 2.5 |
| Tertiary dodecyl mercaptans | 0.5 |
| 1,3-butadiene | 66.0 |
| as an activator system: | |
| Iron (II) sulfate heptahydrate | 0.002 |
| Sodium EDTA (38% aqueous solution) | 0.0045 |
| Sulfuric acid/water solution (pH = 5) | 3.0 |
| Sodium formaldehyde sulfoxylate | 0.03 |
| p-menthane hydroperoxide | 0.09 |

The emulsion was polymerized in the absence of oxygen at 65° F. (18.5° C.). After 3 hours of polymerization time, 75% of the monomer charge was converted to polymer. A 10% aqueous solution containing 0.3 parts of sodium dimethyldithiocarbamate and 0.04 parts of N,N-diethylhydroxylamine was added to shortstop the polymerization. The latex was coagulated and air dried at 150° F. (66° C.). Infrared analysis of a cast film of the polymer indicated the inclusion of hyroxyl, blocked isocyanate, and N,N-anilinophenyl methacrylamide functionalities.

EXAMPLE 16

Tetrahydro-N-[1-methyl-1-[3-(1-methylethenyl)-phenyl]ethyl]-2-oxo-1-H-pyrrolo-1-carboxamide (TOPC) has the structural formula:

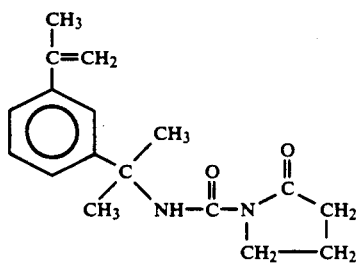

and is an excellent choice as a monomer having pendant blocked isocyanate groups which can be polymerized into rubbers. TOPC is a solid at room temperature and is readily soluble in most monomers commonly used in making synthetic rubber, such as styrene, acrylonitrile, 1,3-butadiene, isoprene, acrylates, vinylidene chloride, and the like. It will also readily polymerize by either solution or emulsion free radical, means under a wide variety of conditions with varying initiator systems, such as azo compounds, peroxides, persulfates and redox systems. Additionally, TOPC will not retard normal polymerization rates.

Rubbers having pendant blocked isocyanate groups which are made with TOPC do not deblock at temperatures below about 160° C. This is highly desirable since deblocking at low temperatures can result in premature crosslinking (scorch) during coagulation, drying and/or compounding steps. Rubbers made with TOPC can also be coagulated by utilizing standard procedures.

Rubbers which are made utilizing TOPC as a comonomer have units which are derived from TOPC incorporated therein. These repeat units which are derived from TOPC have the following structure:

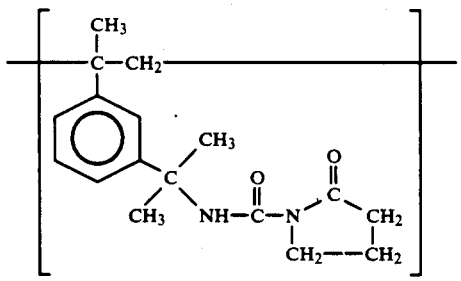

and can be distributed throughout the polymer chains of the rubber in an essentially random manner. Such rubbers will also typically contain repeat units which are derived from conjugated diene monomers, such as isoprene or 1,3-butadiene and can be deblocked by simply heating to temperatures above about 160° C. The deblocking reaction is very fast at temperatures within the range of about 180° C. to about 200° C. As a result of the deblocking reaction, repeat units having the structural formula:

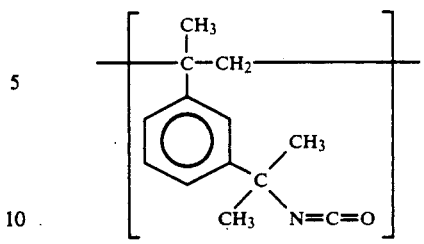

which contain unblocked isocyanate groups are formed and 2-pyrrolidinone (2-pyrrolidone) is liberated. The 2-pyrrolidinone is believed to be relatively non-toxic and has a boiling point of 245° C.

TOPC monomer can be synthesized by the reaction of TMI with 2-pyrrolidinone. This reaction can be carried out over a very wide temperature range with temperatures within the range of about 80° C. to 150° C. being typical. It is generally preferred for this reaction to be conducted at a temperature within the range of 90° C. to 120° C. with temperatures in the range of 95° C. to 110° C. being most preferred. In this reaction one mole of TMI reacts with one mole of 2-pyrrolidinone to produce one mole of TOPC. It is normally preferred for a slight excess of 2-pyrrolidinone to be utilized in the reaction. For example, it is advantageous to employ the 2-pyrrolidinone in an excess of about 2 to about 5 mole percent. The reaction product can be mixed into an aliphatic liquid hydrocarbon to induce crystallization of the TOPC. The aliphatic liquid hydrocarbon will normally be an alkane containing from 5 to 10 carbon atoms, such as hexane, pentane, or octane. The ratio of the aliphatic hydrocarbon employed to the reaction product will normally be from 2:1 to 10:1 by volume and will preferably be from 3:1 to 5:1 by volume.

In this experiment a 5 liter 3-neck flask equipped with a mechanical stirrer, addition funnel, nitrogen inlet and condenser was flushed with nitrogen and charged with 1.065 kg (12.5 moles) of 2-pyrrolidinone and 300 grams of TMI. The mixture was then heated to 100° C. where a small exotherm was noted. At this point, an additional 2.1 kg (10.45 moles) of TMI was added at a rate sufficient to maintain a reaction temperature between 100°-105° C. Additional heat had to be supplied toward the end of the addition. The reaction was allowed to proceed at 105° C. for 2 hours after the addition and then allowed to stand at room temperature for 72 hours. Upon stirring the viscous product with excess hexane at room temperature, the TOPC product slowly crystallized into a dense white solid. The TOPC was then filtered, washed with hexane and dried with 3.19 kg of product being recovered (yield of 93.4%).

EXAMPLE 17

The reaction of TMI with 2-pyrrolidinone can be catalyzed with dibutyltin dilaurate, alkyltin mercaptides, salts of bismuth, salts of lead and the like. In this experiment TOPC was synthesized utilizing dibutyltin dilaurate as a catalyst.

In the procedure employed, a 500 ml 3-neck flask equipped with a magnetic stir bar was charged with 100.5 grams (0.5 moles) of TMI, 41.8 grams (0.5 moles) of 2-pyrrolidinone and 5 drops of dibutyltin dilaurate at room temperature. The flask was equipped with a condenser, thermometer and nitrogen inlet. The reaction vessel was then flushed with nitrogen and slowly heated. At approximately 80°-90° C., the heating mantle was removed and the pot temperature exotherm climbed to 145° C. After this initial exotherm, the temperature was maintained at 100° C. for 4 hours. The mixture was then allowed to stand at room temperature for 72 hours before extracting the mixture 5 times with 50 ml of toluene and decanting from polymeric residue. Toluene was then removed by evaporation and replaced with 100 ml of hexane. Upon cooling and stirring this solution, a white crystalline product separated. The filter off product was washed with cold hexane and 84 grams (59% yield) of TOPC product having a melting point of 49°-54° C. was recovered.

EXAMPLE 18

To evaluate the benefits of the high deblocking temperature of TOPC, a control monomer (blocked with commonly used caprolactam) was synthesized by a modification of the method described in Example 1 of U.S. Pat. No. 4,608,314. Both these monomers were emulsion polymerized at equimolar levels in tumbled quarter (0.95 liter) bottles at 130° F. (54.4° C.) using the recipes shown in Table VI. The polymerizations were run to complete conversion, the rates being determined by percent of solids formation with time. All recipes (A thru F) polymerized at nearly identical rates and reached completion in 18-20 hours at 130° F. (54.4° C.). At constant solids, the bottles were shortstopped by the addition of a dilute aqueous mixture of sodium dimethyldithiocarbamate and diethylhydroxyl amine. After cooling and venting, 2.0 grams of a 50% dispersion of 2,5 di-t-amyl hydroquinone was added to each bottle before stripping. Stripping the latex to remove residual volatile monomers was accomplished by the addition of approximately 400 grams of water per liter of latex followed by the removal of approximately 400 grams of distillate at reduced pressure. A portion of each stripped latex was then coagulated in excess isopropanol, isolated, blotted as dry as possible and its Mooney viscosity determined at 212° F. (100° C.) with the small rotor after 1½ minutes. The dry (solid) rubber recovered did not contain a significant quantity of water. The results are also shown in Table VI.

TABLE VI

Comparison of Caprolactam and Pyrrolidinone Blocked Monomers in Butadiene/Vinylidene Chloride Based Copolymers

| Ingredients | A | B | C | D | E | F |
|---|---|---|---|---|---|---|
| Water, soft, boiled | 200.0 | | | | | |
| 10% aq. potassium stearate | 4.0 | | | | | |
| Trisodium phosphate | 0.22 | | | | | |
| Sodium sulfate | 0.11 | | | | | |
| N-(4-anilinophenyl)-methacrylamide[1] | 2.0 | | | | | |
| Vinylidene chloride | 10.0 | 10.0 | 20.0 | 20.0 | 30.0 | 30.0 |
| Caprolactam blocked monomer | 5.0 | — | 5.0 | — | 5.0 | — |
| Pyrrolidinone blocked monomer | — | 4.55 | — | 4.55 | — | 4.55 |
| Butadiene | 83.0 | 83.45 | 73.0 | 73.45 | 63.0 | 63.45 |
| Azo bis isobutyronitrile | 0.6 | | | | | |
| Tertiary dodecyl mercaptan | 0.5 | | | | | |
| Mooney viscosity, MS (1.5 min. @100° C.) | 81 | 43 | 75 | 34 | 70 | 31 |

[1] A polymerizable antioxidant

It can readily be seen that the Mooney viscosities of polymers A, C & E containing the caprolactam blocked monomer have approximately twice the viscosity levels respectively of the pyrrolidinone blocked polymer analogs B, D & F. This phenomenon occurs due to the low deblocking temperature of the polymerized caprolactam derivative, the deblocking rate being significant at the 100° C. temperature of the Mooney test. The freed polymeric isocyanate subsequently begins to crosslink with residual water, hydroquinones and amine, etc. to rapidly increase polymer viscosity. There is no trace of this behavior in polymers B, D or F containing the pyrrolidinone blocked monomer. This feature is highly desirable in emulsion elastomer compositions since they ideally should maintain a constant Mooney viscosity (molecular weight) during conventional isolation, drying and compounding procedures.

While certain representative embodiments and details have been shown for the purpose of illustrating the invention, it will be apparent to those skilled in this art that various changes and modifications can be made therein without departing from the scope of the invention.

What is claimed is:
1. Tetrahydro-N-[1-methyl-1-[3-(1-methylethenyl)phenyl]ethyl]-2-oxo-1-H-pyrrolo-1-carboxamide.